US006911619B2

(12) United States Patent
Delzenne

(10) Patent No.: US 6,911,619 B2
(45) Date of Patent: Jun. 28, 2005

(54) PLASMA CUTTING TORCH ELECTRODE WITH AN HF/ZR INSERT

(75) Inventor: Michel Delzenne, Franconville (FR)

(73) Assignees: L'Air Liquide, Societe Anonyme pour l'etude et, l'Exploitation des Procedes Georges Claude, Paris (FR); LA Soudure Autogene Francaise, Paris (FR)

(*) Notice: Subject to any disclaimer, the term of this patent is extended or adjusted under 35 U.S.C. 154(b) by 0 days.

(21) Appl. No.: 10/797,236

(22) Filed: Mar. 10, 2004

(65) Prior Publication Data

US 2004/0195220 A1 Oct. 7, 2004

(30) Foreign Application Priority Data

Mar. 14, 2003 (FR) ........................................... 03 03185

(51) Int. Cl.$^{7}$ ................................................ B23K 10/00

(52) U.S. Cl. ............................ 219/121.52; 219/121.59; 219/119

(58) Field of Search ....................... 219/121.52, 121.48, 219/121.36, 74, 75, 121.59, 121.39, 121.44, 119

(56) References Cited

U.S. PATENT DOCUMENTS

| | | | | |
|---|---|---|---|---|
| 3,198,932 A | * | 8/1965 | Weatherly | 219/146.21 |
| 5,105,061 A | | 4/1992 | Blankenship | |
| 5,767,478 A | * | 6/1998 | Walters | 219/121.52 |
| 6,420,673 B1 | * | 7/2002 | Nemchinsky | 219/121.52 |
| 2004/0066827 A1 | * | 4/2004 | Steiger et al. | 372/87 |

FOREIGN PATENT DOCUMENTS

| | | |
|---|---|---|
| EP | 0 822 736 A1 | 4/1996 |
| FR | 2 173 874 | 6/1972 |
| FR | 2 628 253 | 3/1989 |

* cited by examiner

*Primary Examiner*—Mark Paschall
(74) *Attorney, Agent, or Firm*—Linda K. Russell

(57) ABSTRACT

An emissive electrode insert formed from an alloy containing hafnium and zirconium. The insert typically contains at least about 80% hafnium by weight and about 0.1 to about 8% zirconium by weight. The invention also relates to a plasma torch electrode formed from an electrode body with a cavity into which such an emissive insert is fitted, to a plasma torch utilizing such an electrode, and to a plasma cutting process for cutting a steel workpiece, in which such a plasma torch is employed.

17 Claims, 1 Drawing Sheet

PLASMA CUTTING TORCH ELECTRODE WITH AN HF/ZR INSERT

This application claims the benefit of priority under 35 U.S.C. §119 (a) and (b) 1 to French Application No. 0303185, filed Mar. 14, 2003, the entire contents of which are incorporated herein by reference.

BACKGROUND OF THE INVENTION

1. Field of the Invention

The present invention relates to a plasma torch electrode, formed from an electrode body that includes a cavity into which an emissive hafnium/zirconium insert is fitted, and to a plasma torch comprising the said electrode.

2. Related Art

The process of cutting structural steels, that is to say non-alloy or low-alloy carbon steels, or even stainless steels and aluminium alloys, by means of a plasma arc in an oxygen atmosphere has been known for many years.

A plasma cutting device capable of implementing such a process generally comprises a plasma cutting torch comprising a nozzle for ejecting the plasma arc towards the workpiece to be cut, an electrode that forms the cathode, placed a certain distance from the nozzle and coaxially therewith, a supply of plasma gas, such as compressed air, oxygen or any other gas mixture containing at least one oxidizing gas, and a means of delivering the plasma gas into the volume separating the electrode from the nozzle, also called a plasma chamber.

The workpiece itself forms the anode, the cathode and the anode being connected to the terminals of a current generator.

To promote the striking of the arc and to limit high-temperature erosion of the electrode in an oxidizing atmosphere, which electrode is typically made of copper or a copper alloy, it is customary to provide the electrode with an emissive insert, made of zirconium or, depending on the case, hafnium, fitted, coaxially, into the end facing the ejection orifice of the nozzle.

Zirconium is a less expensive material than hafnium, but less resistant to high-temperature erosion by the plasma arc.

Conversely, pure hafnium has the best resistance to erosion by the plasma arc, but is very expensive, especially because of the fact that, in order to be able to obtain pure hafnium, it is necessary to "refine" it during its manufacture so as to remove the impurities that contaminate this material.

Although reputed to have a longer lifetime, electrodes provided with an emissive insert made of pure hafnium wear away in a few hours, typically between 2 and 4 hours, when they are used in a plasma cutting torch.

These electrodes with a hafnium or zirconium emissive insert therefore constitute a consumable item of the torch that it is necessary to replace often, which therefore increases the overall cost of the process and poses problems from the industrial standpoint since, to replace the electrode, it is necessary to stop the insulation and dismantle the front part of the torch.

The problem to be solved is therefore how to provide an emissive electrode insert having a lifetime close to that of electrodes with a pure hafnium insert but for a lower manufacturing cost.

SUMMARY OF THE INVENTION

The solution provided by the invention is therefore an emissive electrode insert formed from an alloy containing hafnium and zirconium.

Depending on the case, the emissive insert of the invention may have one or more of the following technical features:

- it contains at least 80% hafnium by weight, preferably at least 90% hafnium by weight;
- it contains 0.1 to 8% zirconium by weight, preferably 0.5 to 5% zirconium by weight;
- it contains 96 to 99% hafnium by weight, 0.5 to 3.5% zirconium and inevitable impurities for the balance;
- it contains 98.08 to 98.20% hafnium by weight, 1.70 to 1.82% zirconium and inevitable impurities for the balance;
- it is of cylindrical shape; and
- it has a length of 3 mm to 8 mm and a diameter of 1 mm to 4 mm.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

According to another aspect, the invention also relates to a plasma torch electrode formed from an electrode body, comprising a cavity into which an emissive insert according to the invention is fitted, preferably an electrode made of copper or a copper alloy, and to a plasma torch comprising such an electrode, preferably a plasma cutting torch for cutting a workpiece made of steel, in particular structural steel.

The present invention will be more clearly understood thanks to the description below, given with reference to the illustrative figures appended hereto.

Figure 1:
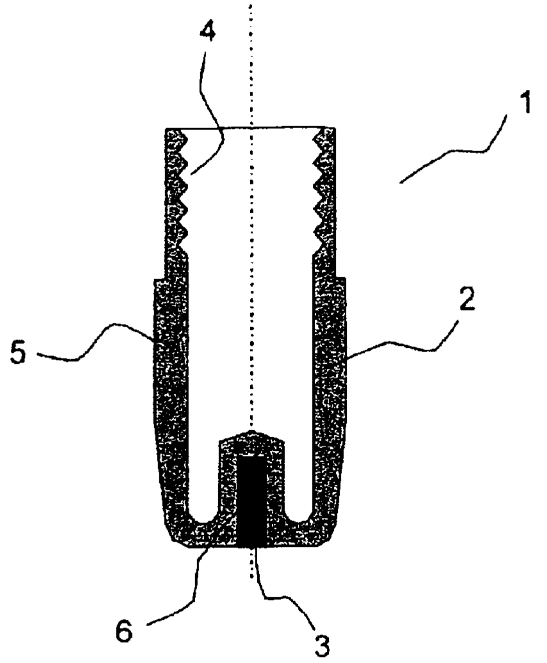
FIG. 1 illustrates a longitudinal sectional view of an electrode in accordance with one embodiment of the present invention.

FIG. 1 is a diagram in a longitudinal sectional view, of an electrode 1 with a solid body consisting of an electrode body 2, of axisymmetric general shape in the form of a cup with a blind hole, which body has, in its upper or upstream part, an internal thread 4 for allowing the electrode 1 to be screwed onto a torch body; in its lower part, or active part, a bore 6' for housing, by being force-fitted, by being crimped and/or by being brazed, an emissive insert 3 made of a hafnium/zirconium alloy according to the invention; and having, in its central part 5, a polygonal, especially hexagonal, external shape so as to take a spanner of suitable shape in order for the electrode 1 to be screwed tightly onto its support in the torch body.

The electrode 1 is made of a copper alloy of the copper/tellurium type, having a tellurium content of about 0.3 to 0.7%, or of the copper/chromium/zirconium type, the balance essentially being copper and possibly inevitable impurities.

Figure 2:
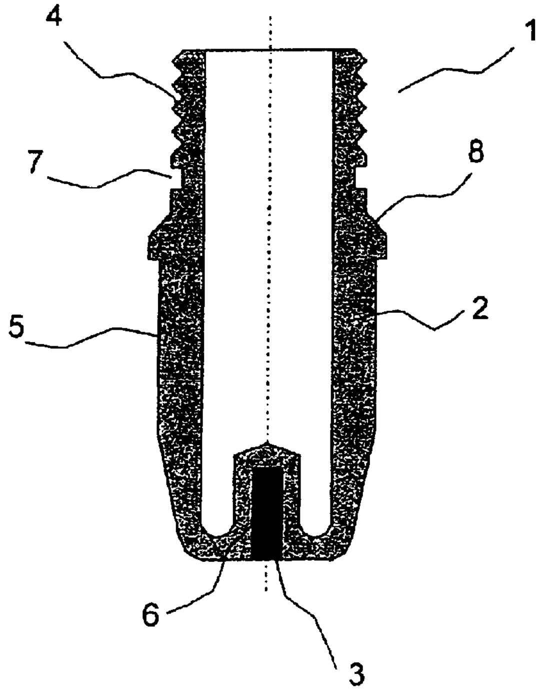
FIG. 2 illustrates a longitudinal sectional view of an electrode in accordance with one alternative embodiment of the present invention.

FIG. 2 shows an electrode 1 of high mechanical strength, of general shape similar to that of FIG. 1 (the similar or identical parts bear the same references) having, in its central part 5, a prismatic or semi-prismatic external shape for taking a spanner of suitable shape in order to screw the electrode 1 onto its support in the torch body and lock it therein.

Moreover, a groove 7, intended to house an O-ring seal, is made between the thread 4 and a bearing surface 8 that forms an assembly stop.

Such an electrode has a high thermal withstand since the use of a copper alloy of the copper/chromium type for producing the electrode 1 allows its geometrical integrity to be maintained, especially close to the emissive insert 3, that is to say without local melting, despite a high temperature at the active end carrying the insert 3.

Within the context of the invention, the insert 3 fitted into the electrodes 1 is made of a hafnium/zirconium alloy.

This is because, in order to guarantee an acceptable lifetime of the electrodes 1 with an insert 3 without this being to the detriment of the cost of the process, the emissive insert 3 according to the invention must be made of a hafnium/zirconium alloy.

To do this, incompletely refined hafnium may be used, in which a controlled proportion of zirconium and possibly other residual impurities, for example Fe, Al, N, Cr, W, Mn, Ta, Si, Mn, O, U, Ti, Nb, Cu, Sn, V, Co, Mg, Ni, Pb, Mo, etc., are intentionally left, the content of each of these inevitable impurities generally never exceeding 0.01% by weight, or even only a few ppm.

It is also possible to use pure hafnium to which a desired proportion of zirconium by weight is added so as to obtain an Hf/Zr alloy in the proportions of the invention, that is to say preferably 96 to 99% hafnium by weight, 0.5 to 3.5% zirconium and inevitable impurities for the balance (about 0.5%), advantageously 98.08 to 98.2% hafnium by weight, 1.7 to 1.82% zirconium and inevitable impurities for the balance (0.027 to 0.1%).

The insert 3 preferably has a cylindrical general shape and is fitted into the electrode body by crimping or the like.

A plasma cutting torch, with the reference OCP 150 sold by La Soudure Autogène Francaise, was equipped with an electrode made of a copper alloy, such as an electrode according to FIG. 1 or 2, fitted with an insert made of a hafnium/zirconium alloy according to the invention (approx. 98.1% Hf by weight+1.82% Zr by weight+impurities for the balance) and was then subjected to a succession of cutting sequences using oxygen as cutting gas until the insert and/or the electrode were extremely worn.

The material to be worked was a plate of structural steel 10 mm in thickness. The cutting current was 120 amps.

These trials have shown that an electrode according to the invention has a lifetime of around 4 hours with 500 striking operations, which is equivalent to the lifetime of electrodes with a pure hafnium insert.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An emissive electrode insert formed from an alloy comprising at least about 80% hafnium by weight, and between about 0.1% to about 8% zirconium by weight.

2. The insert of claim 1, wherein said alloy comprises at least about 90% hafnium by weight.

3. The insert of claim 1, wherein said alloy comprises between about 0.5% and about 5% zirconium by weight.

4. The insert of claim 1, wherein said alloy comprises between about 96% and about 99% hafnium by weight and between about 0.5% and about 3.5% zirconium by weight.

5. The insert of claim 1, wherein said alloy comprises between about 98.08% and about 98.20% hafnium by weight and between about 1.70% and about 1.82% zirconium by weight.

6. The insert of claim 1, wherein said insert is of cylindrical shape.

7. The insert of claim 1, wherein said insert has a length of between about 3 mm and about 8 mm, and a diameter of between about 1 mm and about 4 mm.

8. A plasma torch electrode comprising:

an electrode body comprising a cavity; and an emissive electrode insert comprising at least about 80% hafnium by weight, and between about 0.1% and about 8% zirconium by weight, wherein said insert is fitted into the cavity of said electrode body.

9. The plasma torch electrode of claim 8, wherein said insert comprises copper.

10. The plasma torch electrode of claim 9, wherein said insert comprises a copper alloy.

11. A plasma torch comprising the plasma torch electrode of claim 8.

12. The plasma torch of claim 11, wherein said insert comprises copper.

13. The plasma torch of claim 12, wherein said insert comprises a copper alloy.

14. The plasma torch of claim 11, wherein said plasma torch comprises a plasma cutting torch.

15. The plasma cutting process for cutting a steel workpiece in which said plasma torch of claim 11 is employed.

16. A process for cutting a steel workpiece comprising using a plasma cutting torch wherein the electrode comprises an emissive electrode insert which comprises from about 96% up to about 99% hafnium by weight and from about 0.5% up to about 3.5% zirconium by weight.

17. The process of claim 16 wherein said insert comprises from about 98.08% up to about 98.20% hafnium by weight and from about 1.70% up to about 1.82% zirconium by weight, of cylindrical shape, has a length of from about 3 mm up to about 8 mm, and a diameter of from about 1 mm up to about 4 mm.

* * * * *